J. G. FRASER.
DOOR FASTENER.
APPLICATION FILED MAY 1, 1920.
1,385,125. Patented July 19, 1921.
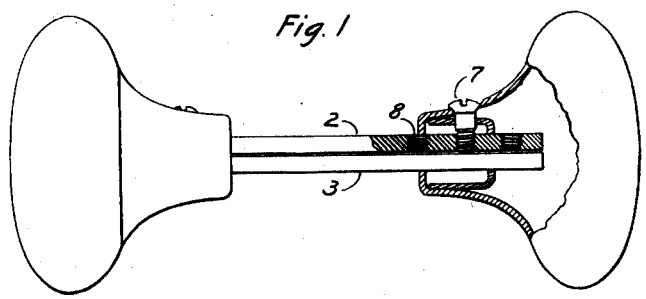
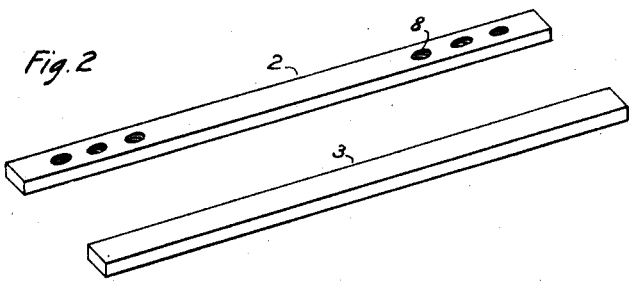
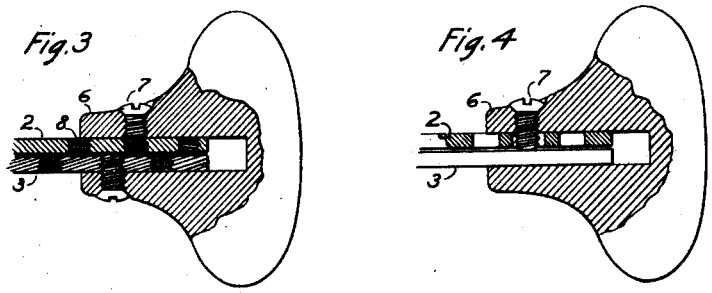
Inventor:
John George Fraser.
Attorney:

UNITED STATES PATENT OFFICE.

JOHN GEORGE FRASER, OF HAMILTON, ONTARIO, CANADA, ASSIGNOR OF ONE-HALF TO GARFIELD I. EVANS, OF HAMILTON, CANADA.

DOOR-FASTENER.

1,385,125.      Specification of Letters Patent.      Patented July 19, 1921.

Application filed May 1, 1920. Serial No. 378,188.

*To all whom it may concern:*

Be it known that I, JOHN GEORGE FRASER, of the city of Hamilton, Province of Ontario, Dominion of Canada, a subject of the King of Great Britain, have invented certain new and useful Improvements in Door-Fasteners; and I hereby declare that the following is a full, clear, and exact description thereof.

My invention relates particularly to door locks, latches and the like having a spindle with a knob or handle at each end for the purpose of turning the same.

Heretofore in door locks of the above mentioned type considerable difficulty has been experienced in mounting the knobs upon the spindle in such a manner that they will not become loose and eventually become detached from the spindle when subjected to the severe stresses and strains encountered in ordinary use. The object of my invention is to provide a construction which will overcome this difficulty and which may be manufactured at minimum cost. To this end I have produced the invention herein set forth and which, briefly stated, consists of an expansible spindle for a door lock or the like with means constructed and arranged to expand the spindle for the purpose of firmly securing the knobs upon the ends thereof.

For full comprehension, however, of my invention reference must be had to the accompanying drawings in which similar reference characters indicate the same parts and wherein:

Figure 1 is a part elevation and part sectional view of the spindle removed and with the knobs mounted thereon;

Fig. 2 is a detail perspective view of the spindle parts; and

Figs. 3 and 4 illustrate modifications of my improved spindle.

The embodiment of my invention illustrated in the accompanying drawings comprises a spindle divided longitudinally into top and bottom parts 2 and 3 respectively, the parts being of substantially the same dimensions and preferably cut in predetermined lengths from a solid steel bar oblong in cross section, the two parts when laid flat upon each other constituting a spindle of rectangular cross section. It is to be distinctly understood however that I do not limit myself to a spindle of this cross-section as one of circular cross-section constituted by parts of semi-circular cross-section might equally well be employed. The knobs illustrated at 4 and 5 may be of metal, glass, porcelain or other suitable material each having a socket 6 as usual, with screw 7 for fastening it in place. The screw is screwed through the handle connection into screwthreaded borings 8 drilled through the top part 2 in close proximity to each end thereof, the screw being of sufficient length to engage the bottom part 3 and cause the parts to be separated as the screw is tightened. This expansion of the spindle causes the parts to bear tightly against the sides of the socket 6 in each knob. This construction and arrangement of parts rigidly secures the knobs in position upon the spindle and permits them to undergo severe strain without becoming dislodged therefrom. The purpose in providing a plurality of screw-threaded borings at each end of part 2 is to enable the spindle to be adjusted to different thickness of doors and any number of holes may be employed with this object in view. It is not absolutely essential that the borings 8 be screw-threaded as they may be drilled to a diameter large enough to accommodate the thread of the retaining screw and the knob screw-threaded instead, or both the knob and boring may be threaded. It may be found desirable to provide each part with screw-threaded borings as illustrated in Fig. 4. In this case it would be necessary to so arrange the borings that a series in one part would be in staggered relation with the adjacent series on the other part so that each screw will engage the part other than the one in which it is mounted and secure the necessary expansion.

What I claim is as follows:

1. In a door fastener the combination with a spindle divided longitudinally into two parts, one of said parts having a plurality of screw-threaded openings in close proximity to each end thereof; of knobs adapted to be mounted upon the ends of said spindle, each knob being chambered to receive the end of the spindle upon which it is to be mounted and having a lateral opening registering with one of the said screw-threaded openings, and means for fastening each knob in position upon the spindle, said means consisting of a screw projecting through said lateral opening and the screw-threaded opening registering therewith, said screw being adapted to separate the parts as it is tightened.

2. In a door fastener the combination with a spindle divided longitudinally into two parts each part having the same width and thickness throughout its length, each of said parts having a plurality of spaced transverse openings at each end thereof, the openings in one part being in staggered relation with the adjacent openings of the other part whereby the inner end of each opening in one part is closed by the face of the other part contacting therewith, of knobs adapted to be mounted upon the ends of said spindle and having oppositely disposed lateral openings in said parts and screws passing through the openings in said knobs and said parts and bearing against the contacting faces of the latter causing separation of the parts for the purpose of maintaining knobs thereon.

In testimony whereof I have signed my name to this specification in the presence of two witnesses.

JOHN GEORGE FRASER.

Witnesses:
G. I. EVANS,
R. P. WALLACE.